United States Patent Office 2,775,562
Patented Dec. 25, 1956

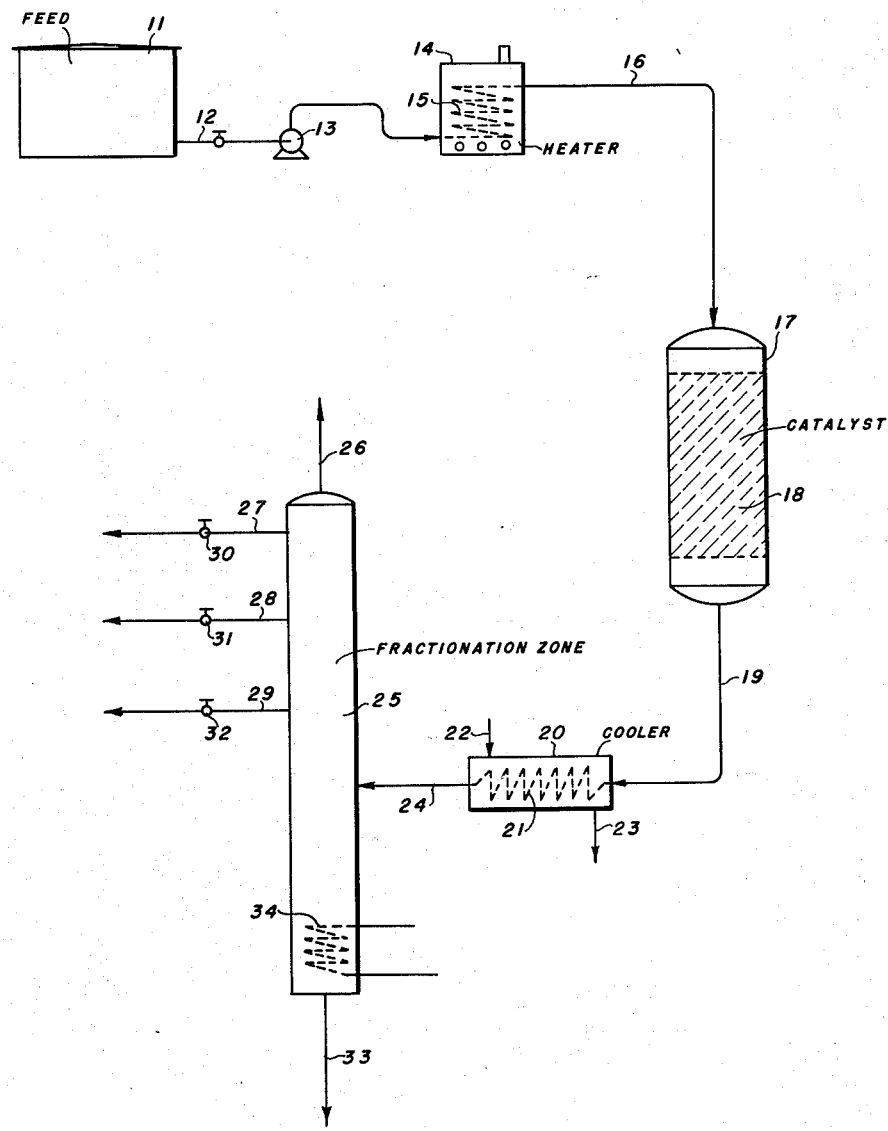
INVENTORS.
Max A. Mosesman,
James A. Dinwiddie,
BY
ATTORNEY.

2,775,562

PREPARATION OF A SILICA-ALUMINA CRACKING CATALYST

James A. Dinwiddie and Max A. Mosesman, Baytown, Tex., assignors, by mesne assignments, to Esso Research and Engineering Company, Elizabeth, N. J., a corporation of Delaware Application March 6, 1953, Serial No. 340,891

6 Claims. (Cl. 252—463)

The present invention is directed to a method for converting hydrocarbons and a catalyst therefor. More particularly, the invention is directed to the cracking of hydrocarbons in contact with an improved catalyst. In its more specific aspects the invention is concerned with an improved silica-alumina catalyst and a method for using same.

This application is a continuation-in-part of Serial No. 318,213, filed November 1, 1952, for James A. Dinwiddie and Max A. Mosesman and entitled "Preparation of Improved Alumina."

The present invention may be briefly described as a catalyst composition comprising silica and alumina derived from boehmite.

The invention also includes a method for converting hydrocarbons which comprises contacting a heated hydrocarbon at a temperature in the range between 800° and 1200° F. with a catalyst comprising silica and alumina derived from boehmite for a length of time sufficient to crack the hydrocarbon and to form a product having improved properties.

The alumina forming a part of the improved catalyst is derived from boehmite, which is a monohydrate of alumina. The boehmite is produced by controlled hydrolysis of aluminum alcoholate. The controlled hydrolysis is effected by subjecting an alcoholate of aluminum, such as an alcoholate formed by reacting aluminum turnings with an aliphatic alcohol having from 1 to 10 carbon atoms, to contact with atmospheric moisture at atmospheric conditions of temperature and pressure to form boehmite.

The alcohols employed in forming the alcoholate may suitably be methyl, ethyl, propyl, butyl, amyl, hexyl, heptyl, octyl, nonyl or decyl alcohols but preferably is an alcohol having from about 5 to 8 carbon atoms. The aluminum metal is reacted with the alcohol at a temperature in the range between 75° and 300° F.

Although it is preferred that the hydrolysis operation be conducted with atmospheric moisture, such as air having a relative humidity of from 20 to 100 percent, the hydrolysis operation can be conducted with steam at a temperature above the boiling point of water or with hot water at a temperature at least at the boiling point of water. Hydrolysis with atmospheric moisture and with steam gives more desirable results than with hot water.

The silica may be introduced into the catalyst at any stage of the process in which the alumina is formed although it is preferred to introduce the silica in the form of an alcohol soluble and hydrolyzable organic compound of silicon with the aluminum alcoholate prior to hydrolysis of the latter. As examples of the organic compounds of silicon may be mentioned ethyl, propyl, butyl, amyl, and phenyl ortho silicates and the like; silicon tetrachloride and other halides of silicon such as silicon bromide, iodide, fluoride, and the like, may also be used.

The amount of the compound of silicon employed should be selected to provide a finished catalyst comprising between 95 and 50 mole percent of silica and between 5 and 50 mole percent of alumina derived from boehmite. Desirable results in converting hydrocarbons may be obtained with a catalyst comprising approximately 10 mole percent of alumina derived from boehmite and approximately 90 mole percent of silica. It is desirable that in no case the amount of alumina derived from boehmite should exceed equimolar amounts of the catalyst and in no case the amount of silica should be less than equimolar amounts of the catalyst.

In employing the catalyst of the present invention in converting hydrocarbons temperatures in the range from 800° to 1200° F. should be employed. Desirable results may be obtained at temperatures between 850° to 950° F.

The operation may be conducted in either a fixed bed or fluidized type of operation. When the operation is in a fixed bed the catalyst, such as described before, may be arranged in a reaction chamber as a vertical bed and the heated hydrocarbon in a vaporous condition allowed to pass therethrough to contact the catalyst intimately for a sufficient length of time to convert the hydrocarbon or to crack it to more desirable products.

When the operation is of the fluidized powder type the heated hydrocarbon in a vaporous condition has the catalyst comprising silica and alumina derived from boehmite suspended in the vaporous hydrocarbon and allowed to contact same as a suspension for a sufficient length of time to crack the heated hydrocarbon. When a fluidized powder type operation is employed, the catalyst of the present invention should be of suitable particle sizes to allow it to be readily suspended in the vaporous hydrocarbon; thus the catalyst may suitably have particle diameters ranging from 0 to 100 microns with the greater portion of the catalyst having particle diameters in the range from about 20 to about 80 microns. Catalyst particles having these diameters may be readily suspended in vaporized hydrocarbons and employed in the fluidized powder technique.

When the catalyst of the present invention is employed in fixed bed operations it may suitably be formed into pills and arranged in either a vertical or horizontal bed and the hydrocarbons passed in contact therewith.

A suitable catalyst may be prepared by adding ethyl orthosilicate, which may or may not be dissolved in normal amyl alcohol, to aluminum amylate in normal amyl alcohol followed by atmospheric hydrolysis by contacting with moisture from the atmosphere under atmospheric conditions of temperature and pressure. Thus a catalyst comprising 95% of silica and 5% of alumina derived from boehmite may be formed by this method.

The invention will be further illustrated by reference to the drawing in which the single figure presents a flow diagram of one preferred mode of operation employing the catalyst of the present invention.

Referring now to the drawing, numeral 11 designates a charge tank in which a feed hydrocarbon, such as a gas oil, is provided from a source not shown. The gas oil is introduced into the system by line 12 containing pump 13 and is pumped into a heater or furnace 14 containing a coil 15. Furnace 14 is provided with heating means, not shown, which serves to raise the temperature of the hydrocarbons passing through coil 15 to a temperature in the range from 800° to 1200° F. and to vaporize the hydrocarbons. The heated and vaporized hydrocarbons issue from furnace 14 by way of line 16 and pass into a fixed bed reaction zone 17 containing a bed of catalyst 18 such as silica and alumina derived from boehmite formed in the manner which has been described. On contact of the heated and vaporous hydrocarbons with the bed 18 for a sufficient length of time the hydrocarbons are converted or cracked to more desirable products. These products issue from reaction zone 17 by line 19 and pass into a cooler or condenser 20 containing a cooling coil 21 wherein the hydrocarbons are cooled to a temperature below the reaction temperature by circulation of water through cooling zone 20 by lines 22 and 23.

The cooled hydrocarbons preferably at a distillation temperature are withdrawn from cooler 20 by line 24 and discharged thereby into a fractionation zone 25 which is shown as a single distillation tower or which may be a plurality of distillation towers, each equipped with all facilities necessary to provide fractional distillation. Zone 25 may suitably include flash vaporization equipment as desired. Thus zone 25 is intended to include suitable internal vapor-liquid contacting means, such as bell cap trays, packing and the like, means for inducing reflux, condensers and the like. Zone 25 is provided with line 26 for removing light overhead fractions and with lines 27, 28 and 29 controlled, respectively, by valves 30, 31 and 32 by way of which the desirable products may be removed as side streams. Heavier fractions may be withdrawn by line 33.

Conditions may be adjusted in zone 25 by heating means illustrated by steam coil 34.

From the foregoing discussion taken with the drawing it will be seen that the present invention is applicable to a simple process for converting hydrocarbons to more desirable products.

In order to illustrate the invention further the desired quantity of ethyl orthosilicate is added to a given quantity of aluminum alcoholate in n-amyl alcohol; the amount of ethyl orthosilicate is selected to provide the desired concentration of silica and gamma alumina in the finished catalyst. The aluminum alcoholate-ethyl orthosilicate-alcohol mixture or solution is then hydrolyzed by contact with atmospheric moisture having a relative humidity of from 20 to 100 percent at atmospheric temperature. The precipitate from the hydrolysis operation is then filtered, dried at 230° F., which may include drying in vacuo, pilled and calcined in air at a temperature of 800° to 1200° F. for 3 to 6 hours. After the calcination operation, the catalyst is suitable for use in fixed bed cracking hydrocarbons.

The catalyst alternatively may be prepared by adding the desired quantity of ethyl orthosilicate to a given amount of boehmite prepared by the prior hydrolysis of the aluminum alcoholate. This admixture, after hydrolysis of the added ethyl orthosilicate by atmospheric moisture is then subjected to the usual drying, pilling, and activation treatments described above. Similarly, silicon tetrachloride may be employed in each of the instances in lieu of ethyl orthosilicate. X-ray diffraction patterns of catalysts produced, as has been described, indicate the finished catalyst to be amorphous.

If it is desired to employ the catalyst in a fluidized powder operation, the calcined catalyst is ground and adjusted to the proper particle size distribution in the range given before.

Although the invention has been described with respect to drying the filtered precipitate by heating, it is contemplated that spray techniques may be employed to accomplish the same result.

Although gas oil hydrocarbons may form the preferred feed stock when the improved catalyst is used in cracking hydrocarbons, it is contemplated that other hydrocarbons may be used. For example, hydrocarbons boiling from about 400° to about 1000° F. may suitably be converted employing the catalyst of the present invention. It is contemplated that distillate hydrocarbons from crude petroleum as well as residual crude petroleum fractions may be used as feed stocks. Thus petroleum fractions constituting the heavier portions of crude petroleums may be suitably contacted with the improved silica and gamma alumina catalyst and converted into useful hydrocarbons.

The nature and objects of the present invention having been completely described and illustrated, what we wish to claim as new and useful and to secure by Letters Patent is:

1. A method for producing a heat stable catalyst suitable for converting hydrocarbons which comprises admixing an alcohol soluble and hydrolyzable silicon compound with aluminum alcoholate, hydrolyzing the admixture by contacting same with water vapor to form a precipitate of said silicon compound and boehmite, drying the precipitate and calcining the dried precipitate at a sufficiently high temperature to form a heat stable catalyst comprising silica and alumina.

2. A method in accordance with claim 1 in which the silicon compound is ethyl orthosilicate.

3. A method in accordance with claim 1 in which the silicon compound is a silicon halide.

4. A method in accordance with claim 1 in which the water vapor is moisture-laden air.

5. A method in accordance with claim 1 in which the water vapor is steam.

6. A method for preparing a heat stable catalyst suitable for cracking operations which comprises incorporating silica with boehmite prepared by prior vaporized water hydrolysis of an aluminum alcoholate prepared by reacting aluminum with an aliphatic alcohol having 1 to 10 carbon atoms in the molecule to form an admixture and then heating the admixture to a temperature in the range between 800° and 1200° F. in the presence of air to obtain a silica and alumina catalyst.

References Cited in the file of this patent

UNITED STATES PATENTS

| 2,317,803 | Reeves et al. | Apr. 27, 1943 |
| 2,636,865 | Kimberlin | Apr. 28, 1954 |
| 2,749,216 | Dinwiddie et al. | June 5, 1956 |

FOREIGN PATENTS

| 667,145 | Great Britain | Feb. 27, 1952 |